United States Patent
Takamura

(10) Patent No.: US 9,845,388 B2
(45) Date of Patent: Dec. 19, 2017

(54) TRANSPARENT POLY(PHENYLENE ETHER) COMPOSITIONS, THEIR METHODS OF MANUFACTURE, AND FOOD PACKAGING FILMS AND CONTAINERS DERIVED THEREFROM

(71) Applicant: SABIC GLOBAL TECHNOLOGIES B.V., Bergen op Zoom (NL)

(72) Inventor: Norihiro Takamura, Tochigi (JP)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/532,415

(22) PCT Filed: Sep. 30, 2015

(86) PCT No.: PCT/IB2015/057493
§ 371 (c)(1),
(2) Date: Jun. 1, 2017

(87) PCT Pub. No.: WO2016/087958
PCT Pub. Date: Jun. 9, 2016

(65) Prior Publication Data
US 2017/0335102 A1  Nov. 23, 2017

Related U.S. Application Data

(60) Provisional application No. 62/087,943, filed on Dec. 5, 2014.

(51) Int. Cl.
| | |
|---|---|
| *C08L 71/12* | (2006.01) |
| *C08J 5/18* | (2006.01) |
| *C08J 3/22* | (2006.01) |
| *C08L 25/06* | (2006.01) |
| *B65D 65/02* | (2006.01) |
| *B65D 81/34* | (2006.01) |
| *B29C 47/00* | (2006.01) |
| *B29K 71/00* | (2006.01) |

(52) U.S. Cl.
CPC ............ *C08L 71/123* (2013.01); *B65D 65/02* (2013.01); *B65D 81/3461* (2013.01); *C08J 3/226* (2013.01); *C08J 5/18* (2013.01); *C08L 25/06* (2013.01); *B29C 47/0021* (2013.01); *B29K 2071/12* (2013.01); *B29K 2995/0026* (2013.01); *C08J 2325/06* (2013.01); *C08J 2371/12* (2013.01); *C08J 2425/06* (2013.01); *C08L 2201/10* (2013.01); *C08L 2203/16* (2013.01); *C08L 2310/00* (2013.01)

(58) Field of Classification Search
None
See application file for complete search history.

(56) References Cited

U.S. PATENT DOCUMENTS

| | | | | |
|---|---|---|---|---|
| 4,172,858 A * | 10/1979 | Clubley | ............... | C08K 5/0066 524/130 |
| 5,760,171 A | 6/1998 | White et al. | | |
| 5,830,965 A * | 11/1998 | Imaizumi | .............. | C08F 210/00 525/356 |
| 5,852,135 A * | 12/1998 | Kanai | ................... | C08F 283/06 525/398 |
| 5,914,206 A * | 6/1999 | Takasaki | ........... | G02F 1/133512 430/270.1 |
| 8,637,131 B1 * | 1/2014 | Balfour | ................. | C08L 71/123 428/35.7 |
| 8,669,309 B1 | 3/2014 | Balfour | | |
| 8,957,143 B2 * | 2/2015 | Balfour | ................... | C08L 71/00 428/36.92 |
| 2008/0045655 A1 * | 2/2008 | Balfour | ................. | C08L 71/123 525/98 |
| 2008/0045656 A1 * | 2/2008 | Balfour | .................. | C08L 71/12 525/98 |
| 2010/0210762 A1 * | 8/2010 | Hanaki | .................... | A61K 8/49 524/83 |
| 2011/0240064 A1 * | 10/2011 | Wales | ...................... | C09D 5/14 134/26 |
| 2012/0097194 A1 * | 4/2012 | McDaniel | .............. | A01N 63/02 134/26 |
| 2012/0308753 A1 * | 12/2012 | Balfour | .................... | C08J 3/203 428/36.92 |
| 2013/0164476 A1 * | 6/2013 | Balfour | .................. | C08L 71/00 428/36.92 |

FOREIGN PATENT DOCUMENTS

| | | |
|---|---|---|
| WO | 2006118832 A2 | 11/2006 |
| WO | 2008021629 | 2/2008 |
| WO | 2014075291 A1 | 5/2014 |

OTHER PUBLICATIONS

International Search Report of the International Searching Authority International Application No. PCT/IB2015/057493; International Filing Date Sep. 30, 2015; dated Dec. 23, 2015; 6 pages.
Written Opinion of the International Searching Authority International Application No. PCT/IB2015/057493; International Filing Date Sep. 30, 2015; dated Dec. 23, 2015; 7 pages.
International Preliminary Report on Patentability; International Application No. PCT/IB2015/057493; International Filing Date Sep. 30, 2015 (45 pages).

* cited by examiner

*Primary Examiner* — Peter A Salamon
(74) *Attorney, Agent, or Firm* — Cantor Colburn LLP

(57) ABSTRACT

This invention generally relates to transparent compositions containing a blend of poly(phenylene ether) and styrenic polymer, methods for their manufacture, and food packaging films and containers derived therefrom.

10 Claims, No Drawings

TRANSPARENT POLY(PHENYLENE ETHER) COMPOSITIONS, THEIR METHODS OF MANUFACTURE, AND FOOD PACKAGING FILMS AND CONTAINERS DERIVED THEREFROM

CROSS-REFERENCE TO RELATED APPLICATIONS

This application is a National Stage application of PCT/IB2015/057493, filed Sep. 30, 2015, which claims the benefit of U.S. Provisional Application No. 62/087,943, filed Dec. 5, 2014, both of which are incorporated by reference herein in their entirety.

FIELD OF THE INVENTION

This invention generally relates to transparent compositions containing a blend of poly(phenylene ether) and styrenic polymer, processes for their manufacture, and microwavable food packaging such as containers and food wrapping films derived therefrom.

BACKGROUND

The need for improved microwavable food packaging materials persists as the number and types of microwavable foods increases. According to a report from Global Industry Analysts, the global consumer market for microwavable foods continues to grow and is forecast to reach $91 billion in 2015.

Packaging for microwavable food is typically made from plastic materials. The Food and Drug Administration (FDA) establishes regulations and testing standards for food containers and food packaging. Packaging manufacturers must disclose the chemical nature of the container or film, the components, as well as any potential health hazards. In addition, the FDA tests food contact surfaces for migration of polymers, and polymer additives into food. FDA approval of a packaging container or food wrapping film ensures that the packaging container or wrapping film is safe for use as a food contact surface, and it complies with all standards of industry. Containers and wrapping films must also be pleasing in appearance and color to consumers.

Plastics used to make containers for microwavable food must have mechanical strength; that is, the packaging needs to be sturdy, rigid in shape, and capable of supporting the food within before and after microwave heating in conventional home (500 W) and restaurant/convenience store microwave ovens (1600 W). Packaging also needs to be heat resistant and capable of withstanding temperatures of up to 230° F. (110° C.) for microwave ovens and up to 400° F. (210° C.) for dual oven applications.

While the electromagnetic radiation used in microwave ovens does not directly interact with the packaging, food products that contain oils and fats can create localized temperatures of as much as 300° F. (150° C.) on the container surface. This localized heating may result in polymer degradation or conformation changes. Thus, the packaging should also maintain its visual appearance after heating in a microwave oven and should resist migration into food substances. For example, a conventional lid for a microwave food container must be sufficiently transparent so that the food product inside the package is visible. Typically, the lid may be fabricated from general purpose polystyrene, which has a heat distortion temperature (HDT) of 90° C. Such a lid is prone to deformation in the presence of oily food products, for example, because oily food products may generate heat upon warming in a microwave oven.

As a result, a need remains for microwavable food packages and food wrapping films. In particular, there is a need for polymer materials that can be used for food packaging that maintain their physical characteristics and that remain transparent after being heated in a microwave oven.

SUMMARY OF THE INVENTION

These and other needs are met by the present invention, which is directed to a polymer material that can be used to make microwavable food packages and food wrapping films. We have discovered that blending general purpose polystyrene with a master batch that comprises poly(phenylene ether) and conventional polystyrene provides a sufficiently transparent material with desirable thermal stability that can be used in fabricating microwavable food containers. The resin additionally comprises an FDA compliant optical enhancing agent and one or more FDA compliant dyes.

In one aspect, the invention is directed to a microwavable food package or food wrapping film fabricated from a polymer composition which comprises a blend of 13 to 94 percent by weight of master batch and 87 to 6 percent by weight of styrenic polymer, wherein the master batch comprises:
(a) 40 to 75 percent by weight of a poly(phenylene ether);
(b) 25 to 60 percent by weight of a styrenic polymer;
(c) 0.01 to 2.5 percent by weight of an optical enhancing additive;
(d) 0.003 to 0.012 percent by weight of a colorant;
(e) 0 to 3 percent by weight of an unsaturated di- or trifunctional carboxylic acid; wherein:
the master batch is characterized by:
(i) a heat deflection temperature that is 92° C. to 146° C. as measured according to ASTM D648 on 6.4 mm thick bars at 1.82 MPa;
(ii) a Haze value of less than 5;
and the blend is characterized by:
(i) a heat deflection temperature that is 92° C. to 146° C. as measured according to ASTM D648 on 6.4 mm thick bars at 1.82 MPa; and
(ii) a Haze value of less than 3 as measured according to; and
(iii) a Yellowness index for films that are 200 micrometer in thick of between −5 and 2.5; and provided:
when unsaturated di- or trifunctional carboxylic acid is present, the microwavable food package or wrapping film contains 1250 or less specks that are 200 μm in size or larger in 1 m$^2$ as measured according to film surface analyzer; and further provided:
when there is 0.009 to 0.012 percent by weight of colorant present in the composition, the amount of unsaturated di- or trifunctional carboxylic acid is greater than 0 percent by weight.

In another aspect, the invention is directed to a process for preparing a polymer composition for use in fabricating microwavable food containers and films, comprising:
compounding to form a master batch:
(a) 40 to 75 percent by weight of a poly(phenylene ether);
(b) 25 to 60 percent by weight of a styrenic polymer;
(c) 0.01 to 2.5 percent by weight of an optical enhancing additive;
(d) 0.003 to 0.012 percent by weight of a colorant;

(e) 0 to 3 percent by weight of an unsaturated di- or trifunctional carboxylic acid;
  wherein the master batch is characterized by:
    (i) a heat deflection temperature that is 92° C. to 146° C. as measured according to ASTM D648 on 6.4 mm thick bars at 1.82 MPa;
    (ii) a Haze value of less than 5; and
  blending the master batch with additional styrenic polymer to form a blend comprising 13 to 94 percent by weight of master batch and 87 to 6 percent by weight of styrenic polymer, wherein the blend is characterized by:
    (i) a heat deflection temperature that is 92° C. to 146° C. as measured according to ASTM D648 on 6.4 mm thick bars at 1.82 MPa; and
    (ii) a Haze value of less than 3 as measured according to; and
    (iii) a Yellowness index for films that are 200 micrometer in thick of between −5 and 2.5; and provided:
  when unsaturated di- or trifunctional carboxylic acid is present, the microwavable food package or wrapping film contains 1250 or less specks that are 200 μm in size or larger in 1 m² as measured according to film surface analyzer; and further provided:
  when there is 0.009 to 0.012 percent by weight of colorant present in the composition, the amount of unsaturated di- or trifunctional carboxylic acid is greater than 0 percent by weight.

The polymer composition prepared by the process described herein can be used to fabricate microwavable food packages and food wrapping films because it has improved thermal stability compared to conventional general purpose polystyrene. The improved thermal stability is due to the blending of the poly(phenylene ether) resin as a master batch with conventional general purpose polystyrene. Surprisingly, the poly(phenylene ether) in the master batch has unique characteristics in that it is miscible and forms a homogeneous phase with polystyrene. At certain ratios discovered by the inventors, an increase in the glass transition temperature of polystyrene is observed, lending to the increased thermal stability of the packaging material.

As is known in the art, poly(phenylene ether) resin is prone to crosslinking gel generation during compounding and molding at high temperature. The gel particles (particularly those having a diameter of 200 micrometers or greater) are visible to the naked eye on films fabricated from the material, thus detracting from the overall aesthetic performance of the polymer composition for packaging purposes. Thus, the polymer composition described herein is typically formulated to be transparent, and is characterized by a blue tint that is generally favored among consumers. In addition, the composition has reduced incidence of yellowing and clouding, adding to the aesthetic performance of the resin. Finally, in addition to being more transparent and less prone to yellowing, the polymer composition has a heat deflection temperature (HDT) in the range of 92° C. to 146° C., which is desirable for materials used to fabricate food containers.

In other aspects, the invention is directed to process for fabricating microwavable food packages and food wrapping films from the composition.

DETAILED DESCRIPTION OF THE INVENTION

As used herein the singular forms "a," "an," and "the" include plural referents. The term "combination" is inclusive of blends, mixtures, alloys, reaction products, and the like.

Unless defined otherwise, technical and scientific terms used herein have the same meaning as is commonly understood by one of skill in the art. The term "polymer" as used herein includes oligomers, homopolymers, and copolymers. Compounds are described using standard nomenclature. The term "and a combination thereof" is inclusive of a combination of one or more of the named components, optionally with one or more other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "approximately." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to an amount" means that the named component is present in some amount more than 0, and up to and including the higher named amount.

As used herein, "alkyl" means a straight or branched chain alkyl group, preferably a $(C_{1-18})$ alkyl group, and includes for example methyl, ethyl n-butyl, isobutyl, tert-butyl, octyl, decyl, stearyl. "Alkoxy" means a straight or branched alkoxy group, preferably a $(C_{1-18})$ alkoxy group, and includes, for example, methoxy, ethoxy, butoxy, and nonyloxy. "Aryl" means a group containing an unsaturated ring of six carbon atoms, which may optionally be substituted with one or more alkyl groups, and includes, for example, phenyl, tolyl, and xylyl. "Aryloxy" means an oxygen radical that is substituted with an unsaturated ring of six carbon atoms, which itself may optionally be substituted with one or more alkyl groups, and includes, for example, phenoxy.

The Master Batch (MB) Components

Poly(Phenylene Ether)

The composition used to fabricate microwavable food packages and food wrapping films comprises at least one poly(phenylene ether) resin. Although all conventional poly(phenylene ether)s can be employed with the present invention, poly(phenylene ether)s ("PPE") are preferred. Poly(phenylene ether)s are known polymers comprising a plurality of structural units of the formula:

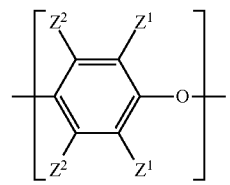

wherein for each structural unit, each $Z^1$ is independently $C_1$-$C_{12}$ hydrocarbylthio (that is, $(C_1$-$C_{12}$ hydrocarbyl)S—), $C_1$-$C_{12}$ hydrocarbyloxy, or unsubstituted or substituted $C_1$-$C_{12}$ hydrocarbyl provided that the hydrocarbyl group is not tertiary hydrocarbyl; and each $Z^2$ is independently hydrogen, $C_1$-$C_{12}$ hydrocarbylthio, $C_1$-$C_{12}$ hydrocarbyloxy, or unsubstituted or substituted $C_1$-$C_{12}$ hydrocarbyl provided that the hydrocarbyl group is not tertiary hydrocarbyl. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether).

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations comprising at least one of the foregoing.

In some embodiments, the poly(phenylene ether) has an intrinsic viscosity of about 0.1 to about 1 deciliter per gram measured at 25° C. in chloroform. Specifically, the poly(phenylene ether) intrinsic viscosity may be about 0.2 to about 0.8 deciliter per gram, more specifically about 0.3 to about 0.6 deciliter per gram, and more specifically about 0.37 to about 0.47 deciliter per gram.

The poly(phenylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

It will be apparent to those skilled in the art from the foregoing that the poly(phenylene ether)s include all those presently known, irrespective of variations in structural units or ancillary chemical features.

In embodiment, the poly(phenylene ether) is poly(2,6-dimethyl-1,4-phenylene ether), CAS Reg. No. 24938-67-8. A suitable amount of poly(phenylene ether) in the composition is about 40 to about 75 percent by weight of the master batch. In one embodiment, the amount is about 45 to about 70 percent by weight of the master batch. In another embodiment, the amount is about percent by weight of the master batch. In another embodiment, the amount is about 40 to about 60 percent by weight of the master batch.

In one embodiment, the poly(phenylene ether) is poly(2,6-dimethyl-1,4-phenylene ether) having an intrinsic viscosity of approximately 0.29-0.49 dL/g as measured in chloroform at 25° C. In another embodiment, the poly(phenylene ether) is poly(2,6-dimethyl-1,4-phenylene ether) having an intrinsic viscosity of approximately 0.37-0.47 dL/g as measured in chloroform at 25° C. In another embodiment, the poly(phenylene ether) is poly(2,6-dimethyl-1,4-phenylene ether) having an intrinsic viscosity of approximately 0.375-0.425 dL/g as measured in chloroform at 25° C. In another embodiment, the poly(phenylene ether) is poly(2,6-dimethyl-1,4-phenylene ether) having an intrinsic viscosity of approximately 0.40 dL/g as measured in chloroform at 25° C. In another embodiment, the poly(phenylene ether) is poly(2,6-dimethyl-1,4-phenylene ether) having an average intrinsic viscosity of approximately 0.40 dL/g as measured in chloroform at 25° C. In another embodiment, the poly(phenylene ether) is poly(2,6-dimethyl-1,4-phenylene ether) having an intrinsic viscosity of approximately 0.46 dL/g as measured in chloroform at 25° C. In another embodiment, the poly(phenylene ether) is poly(2,6-dimethyl-1,4-phenylene ether) having an average intrinsic viscosity of approximately 0.46 dL/g as measured in chloroform at 25° C.

Styrenic Polymer

In addition to the poly(phenylene ether), the composition further comprises at least one styrenic polymer. The term "styrenic polymer" as used herein includes styrenic polymers prepared by methods known in the art including bulk, suspension, and emulsion polymerization, which contain at least 25 weight percent of structural units derived from monomer of the formula:

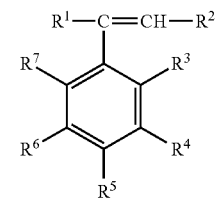

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^3$ and $R^4$ are taken together with the central aromatic ring to form a naphthyl group. Specific alkenyl aromatic monomers include, for example, styrene and methylstyrenes such as alpha-methylstyrene and p-methylstyrene. In some embodiments, the alkenyl aromatic monomer is styrene.

In one embodiment, the polystyrene is general purpose polystyrene (GPPS). The compositions and films produced therefrom comprise the styrenic polymer in an amount of about 25 to about 60 weight percent, based on the total weight of the master batch. Specifically, the styrenic polymer concentration may be about 30 to about 60 weight percent, more specifically about 40 to about 60 weight percent.

Optical Enhancer

The composition of the present invention further comprises one or more FDA compliant optical enhancing agent which decolorizes the composition. Optical enhancing agents are typically selected from the group consisting of alpha-hydroxyketones or unsubstituted or substituted trihydrocarbyl phosphites.

Alpha-hydroxyketones have the general formula

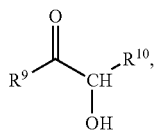

wherein $R^9$ is aryl or $C_1$-$C_{12}$ hydrocarbyl optionally substituted with hydroxy or ketone groups; and $R^{10}$ is hydrogen, aryl, or $C_1$-$C_{12}$ hydrocarbyl, optionally substituted with hydroxy or ketone groups. Suitable alpha-hydroxyketones include, for example, hydroxyacetone (1-hydroxy-2-propanone; Chemical Abstracts Service (CAS) Reg. No. 116-09-6), acetoin (3-hydroxy-2-butanone; CAS Reg. No. 513-86-0), 2-hydroxyacetophenone (CAS Reg. No. 528-24-1), benzoin (2-hydroxy-2-phenylacetophenone, CAS Reg. No. 119-53-9), 2-hydroxy-1-phenyl-2-p-tolyl-ethanone (CAS Reg. No. 2431-02-9), and the like, and combinations thereof.

Trihydrocarbyl phosphites may have the general structure $P(OR^{11})_3$, wherein each occurrence of $R^{11}$ is independently $C_1$-$C_{18}$ hydrocarbyl. In some embodiments, each $R^{11}$ is independently $C_6$-$C_{18}$ alkyl. Suitable trihydrocarbyl phosphites include, for example, trioctyl phosphite, tridecyl phosphite (TDP), tridodecyl phosphite, phenyl didecyl phosphite, decyl diphenyl phosphite, triphenyl phosphite, tritolyl phosphites, and the like, and combinations thereof. Suitable trihydrocarbyl phosphites further include Spiro diphosphites such as, for example, 3,9-bis[2,4-bis(1,1-dimethylethyl)phenoxy]-2,4,8,10-tetraoxa-3,9-diphosphaspiro[5.5]undecane (CAS Reg. No. 26741-53-7; commercially available from Ciba under the trade name IRGAFOS 126).

In one embodiment, the FDA compliant optical enhancing agent is benzoin. The amount of benzoin is typically 0.01 to 2.5 percent by weight of the master batch. In another embodiment, the amount of benzoin is 0.25 to 2.4 percent by weight of the master batch. In another embodiment, the amount of benzoin is 0.4 to 2.25 percent by weight of the master batch. In another embodiment, the amount of benzoin is 0.5 to 2 percent by weight of the master batch. In another embodiment, the amount of benzoin is 0.5 to 1.5 percent by weight of the master batch.

Colorant

The composition of the present invention includes one or more FDA compliant colorants. Colorants and optical brighteners explicitly cleared by FDA for use in polymers ("food contact polymers") are listed in 21 C.F.R. §178.3297 ("Colorants for polymers"). The FDA also continues to allow those of skill in the art to determine the food additive status of colorants in food-contact polymers by, for example, testing that determines that a particular color is not expected to migrate to food and is hence not a "food additive" subject to premarket regulatory clearance. Various colorants are also permitted for use in polymers by virtue of Threshold of Regulation listings or applicable Food Contact Notifications available from the FDA, such as listed at:

www.fda.gov/Food/IngredientsPackagingLabeling/PackagingFCS/Threshold RegulationExemptions/default (last visited Dec. 4, 2014); and www.fda.gov/Food/IngredientsPackagingLabeling/PackagingFCS/Notifications/default (last visited Dec. 4, 2014).

While the former allow any manufacturer to utilize the colorant provided the limitations of the threshold listing are met, Food Contact Notifications only allow the submitter of the FCN and its customers to rely on the notification.

In one embodiment, the colorant is a blue colorant that has been authorized by use in food contact materials such as packaging and the like. For example, in one embodiment, the colorant is C.I. Blue Solvent 104, CAS Reg. No. 116-75-6, available as SOLVAPERM™ Blue 2B from Clariant. In another embodiment, the colorant is Anthraquinone dye, CAS Reg. No. 81-48-1, available from Lanxess as MACROLEX™ Violet B. In another embodiment, a mixture of colorants is used. Thus, in a further embodiment, the colorant is a mixture of C.I. Blue Solvent 104 and anthraquinone dye.

In one embodiment, the amount of the colorant is 0.003 to 0.012 percent by weight of the master batch. In another embodiment, the amount of the colorant is 0.005 to 0.012 percent by weight of the master batch. In another embodiment, the amount of the colorant is 0.004 to 0.011 percent by weight of the master batch. In another embodiment, the amount of the colorant is 0.008 to 0.012 percent by weight of the master batch. In these and other embodiments, the colorant is a mixture of C.I. Blue Solvent 104 and anthraquinone dye.

Carboxylic Acid

The composition of the present invention also optionally includes an FDA compliant unsaturated di- or trifunctional carboxylic acid. The unsaturated di- or trifunctional carboxylic acid is typically selected from the group consisting of citric acid, fumaric acid, itaconic acid, and malic acid, and mixtures thereof.

In one embodiment, the amount of the unsaturated di- or trifunctional carboxylic acid is 0 to 3 percent by weight of the master batch. In another embodiment, the amount of the unsaturated di- or trifunctional carboxylic acid is 0.01 to 2 percent by weight of the master batch. In another embodiment, the amount of the unsaturated di- or trifunctional carboxylic acid is 0.5 to 1.75 percent by weight of the master batch. In another embodiment, the amount of the unsaturated di- or trifunctional carboxylic acid is 0.75 to 1.5 percent by weight of the master batch. In another embodiment, the amount of the unsaturated di- or trifunctional carboxylic acid is 0.9 to 1.1 percent by weight of the master batch. In these and other embodiments, the unsaturated di- or trifunctional carboxylic acid is citric acid, fumaric acid, or a mixture thereof.

The Blend Components

In one embodiment, the pelletized master batch (MB) is blended with pelletized styrenic polymer to adjust the poly (phenylene ether) content in the resulting packaging material. Typically, the styrenic polymer is general purpose polystyrene as described herein In one embodiment, the master batch is blended with additional styrenic polymer to form a blend comprising 13 to 94 percent by weight of master batch as described in previous embodiments and 87 to 6 percent by weight of styrenic polymer, also as described in previous embodiments. In another embodiment, the blend comprises 16 to 94 percent by weight of master batch as described in previous embodiments and 84 to 6 percent by weight of styrenic polymer. In another embodiment, the blend comprises 14 to 94 percent by weight of master batch as described in previous embodiments and 86 to 6 percent by weight of styrenic polymer. In another embodiment, the blend comprises 60 to 90 percent by weight of master batch as described in previous embodiments and 10 to 40 percent by weight of styrenic polymer. In another embodiment, the blend comprises 70 to 80 percent by weight of master batch as described in previous embodiments and 20 to 30 percent by weight of styrenic polymer. In another embodiment, the blend comprises 40 to 90 percent by weight of master batch as described in previous embodiments and 10 to 60 percent by weight of styrenic polymer. In another embodiment, the blend comprises 50 to 90 percent by weight of master batch as described in previous embodiments and 10 to 50 percent by weight of styrenic polymer. In another embodiment, the blend comprises 40 to 80 percent by weight of master batch as described in previous embodiments and 20 to 60 percent by weight of styrenic polymer. In another embodiment, the blend comprises 50 to 80 percent by weight of master batch as described in previous embodiments and 20 to 50 percent by weight of styrenic polymer.

Microwavable Food Packages and Food Wrapping Films

The compositions that are made according to the process described herein are suitable for various uses. Thus, in another aspect, the invention is directed to an article prepared from the composition described herein, such as a microwavable food package or a microwavable food wrapping film.

In one embodiment, the article is a microwavable food wrapping film.

In another embodiment, the article is a microwavable food package is a container with a cover or top.

In another embodiment, a food wrapping film that is fabricated from the composition prepared by the process contains 1250 or less specks that are 200 μm in size or larger in 1 m$^2$.

In another embodiment, a food wrapping film that is fabricated from the composition prepared by the process contains 300 or less specks that are 200 μm in size or larger in 1 m$^2$.

More particularly, in one aspect, the invention is directed to a microwavable food package or food wrapping film fabricated from a polymer composition which comprises a blend of 13 to 94 percent by weight of master batch and 87 to 6 percent by weight of styrenic polymer, wherein the master batch comprises:
  (a) 40 to 75 percent by weight of a poly(phenylene ether);
  (b) 25 to 60 percent by weight of a styrenic polymer;
  (c) 0.01 to 2.5 percent by weight of an optical enhancing additive;
  (d) 0.003 to 0.012 percent by weight of a colorant;
  (e) 0 to 3 percent by weight of an unsaturated di- or trifunctional carboxylic acid; provided that when there is 0.009 to 0.012 percent by weight of colorant present in the composition, the amount of unsaturated di- or trifunctional carboxylic acid is greater than 0 percent by weight; and wherein:
  the master batch is characterized by:
    (i) a heat deflection temperature that is 92° C. to 146° C. as measured according to ASTM D648 on 6.4 mm thick bars at 1.82 MPa;
    (ii) a Haze value of less than 5; and
  and the blend is characterized by:
    (i) a heat deflection temperature that is 92° C. to 146° C. as measured according to ASTM D648 on 6.4 mm thick bars at 1.82 MPa; and
    (ii) a Haze value of less than 3 as measured according to; and
    (iii) a Yellowness index for films that are 200 micrometer in thick of between −5 and 2.5 and provided:
  when unsaturated di- or trifunctional carboxylic acid is present, the microwavable food package or wrapping film contains 1250 or less specks that are 200 μm in size or larger in 1 m$^2$ as measured according to film surface analyzer; and further provided:
  when there is 0.009 to 0.012 percent by weight of colorant present in the composition, the amount of unsaturated di- or trifunctional carboxylic acid is greater than 0 percent by weight.

In one embodiment of this aspect, the poly(phenylene ether) is poly(2,6-dimethyl-1,4-phenylene ether) in the microwavable food package or food wrapping film has an intrinsic viscosity of approximately 0.29-0.49 dL/g as measured in chloroform at 25° C.

In another embodiment, the styrenic polymer in the microwavable food package or food wrapping film is a general purpose polystyrene.

In another embodiment, the carboxylic acid in the microwavable food package or food wrapping film is selected from the group consisting of citric acid, fumaric acid, itaconic acid, and malic acid, and mixtures thereof.

In another embodiment, the optical enhancing additive in the microwavable food package or food wrapping film is an alpha-hydroxyketone selected from the group consisting of hydroxyacetone (1-hydroxy-2-propanone; acetoin (3-hydroxy-2-butanone; 2-hydroxyacetophenone; benzoin (2-hydroxy-2-phenylacetophenone; and 2-hydroxy-1-phenyl-2-p-tolyl-ethanone.

In another embodiment, the optical enhancing additive in the microwavable food package or food wrapping film is benzoin.

In another embodiment, 0.008 to 0.012 percent by weight of colorant is present in the master batch in the in the microwavable food package or food wrapping film.

In another embodiment, 0.01 to 2 percent by weight of the unsaturated di- or trifunctional carboxylic acid is present.

In another embodiment, the unsaturated di- or trifunctional carboxylic acid is fumaric acid, citric acid, or a mixture thereof.

In another embodiment, the heat deflection temperature of the master batch is 100° C. to 146° C. In another embodiment, the heat deflection temperature of the master batch is 105° C. to 140° C. In another embodiment, the heat deflection temperature of the master batch is 105° C. to 138° C. In another embodiment, the heat deflection temperature of the master batch is 110° C. to 140° C. In another embodiment, the heat deflection temperature of the master batch is 112° C. to 133° C.

In another embodiment, the heat deflection temperature of the blend is 100° C. to 140° C. In another embodiment, the heat deflection temperature of the blend is 105° C. to 138° C. In another embodiment, the heat deflection temperature of the blend is 110° C. to 136° C. In another embodiment, the heat deflection temperature of the blend is 112° C. to 130° C.

In another embodiment, the master batch of the microwavable food package or food wrapping film comprises:
  (a) 40 to 70 percent by weight of a poly(phenylene ether);
  (b) 30 to 60 percent by weight of a styrenic polymer;
  (c) 0.5 to 2 percent by weight of benzoin;
  (d) 0.005 to 0.012 percent by weight of a colorant;
  wherein the master batch is characterized by:
    (i) a heat deflection temperature that is 100° C. to 146° C. as measured according to ASTM D648 on 6.4 mm thick bars at 1.82 MPa;
    (ii) a Haze value of less than 3;
  and the blend comprises 14 to 94 percent by weight of master batch and 6 to 86 percent by weight of styrenic polymer, wherein the blend is characterized by:

(i) a heat deflection temperature that is 100° C. to 140° C. as measured according to ASTM D648 on 6.4 mm thick bars at 1.82 MPa.

In another embodiment, the master batch of the microwavable food package or food wrapping film comprises:
(a) 40 to 60 percent by weight of a poly(phenylene ether);
(b) 40 to 60 percent by weight of a styrenic polymer;
(c) 0.25 to 2.40 percent by weight of benzoin;
(d) 0.004 to 0.012 percent by weight of a colorant;
(e) 0.01 to 2 percent by weight of an unsaturated di- or trifunctional carboxylic acid which is fumaric acid, citric acid, or mixtures thereof;
wherein the master batch is characterized by:
(i) a heat deflection temperature that is 105° C. to 140° C. as measured according to ASTM D648 on 6.4 mm thick bars at 1.82 MPa;
(ii) a Haze value of less than 4;
and the blend comprises 16 to 94 percent by weight of master batch and 6 to 84 percent by weight of styrenic polymer, wherein the blend is characterized by:
(i) a heat deflection temperature that is 105° C. to 138° C. as measured according to ASTM D648 on 6.4 mm thick bars at 1.82 MPa.

In another embodiment, a film that is fabricated from the composition prepared by the process contains 1250 or less specks that are 200 μm in size or larger in 1 m².

In another embodiment, a film that is fabricated from the composition prepared by the process contains 600 or less specks that are 200 μm in size or larger in 1 m².

In another embodiment, a film that is fabricated from the composition prepared by the process contains 300 or less specks that are 200 μm in size or larger in 1 m².

In another embodiment, the master batch of the microwavable food package or food wrapping film comprises:
(a) 40 to 75 percent by weight of a poly(phenylene ether);
(b) 25 to 60 percent by weight of a styrenic polymer;
(c) 0.01 to 2.5 percent by weight of an optical enhancing additive;
(d) 0.003 to 0.012 percent by weight of a colorant;
(e) 0 to 3 percent by weight of an unsaturated di- or trifunctional carboxylic acid;
wherein the master batch is characterized by:
(i) a heat deflection temperature that is 110° C. to 140° C. as measured according to ASTM D648 on 6.4 mm thick bars at 1.82 MPa;
(ii) a Haze value of less than 2; and
and the blend comprises 16 to 94 percent by weight of master batch and 6 to 84 percent by weight of styrenic polymer, wherein the blend is characterized by:
(i) a heat deflection temperature that is 110° C. to 136° C. as measured according to ASTM D648 on 6.4 mm thick bars at 1.82 MPa.

In a further embodiment, the blend is characterized by a Notched Izod Impact of 1.5 to 4.5 kg·cm/cm as measured according to ASTM D256.

In another embodiment, a film that is fabricated from the composition prepared by the process contains 300 or less specks that are 200 μm in size or larger in 1 m² as measured according to film surface analyzer.

In these and other embodiments, the master batch has a Notched Izod Impact of 1.5 to 3.5 kg·cm/cm as measured according to ASTM D256; and a melt flow rate of 10 to 100 g/10 min at 300° C., 5 kg loading as measured according to ASTM D1238.

Processes for making such articles are readily known and available to the skilled artisan.

Preparing the Composition Comprising the Master Batch and the Blend

Any type of extruder that is capable of providing a homogenous melt of poly(phenylene ether), poly(alkenyl aromatic) and/or additional resins and additives, may be used in the process disclosed herein to prepare the master batch and the blend that is useful for fabricating microwavable food containers. Useful types of extruders include, for example, a twin screw counter-rotating extruder, a twin screw co-rotating extruder, a single screw extruder, a single screw reciprocating extruder, a kneader, a ring extruder, a combination of the foregoing, and the like. A single extruder or multiple extruders may be employed. In one embodiment, a single screw extruder is used. However, it is generally preferable to use multi-screw extruders due to their greater pumping capability through the melt filtration system. Twin-screw counter-rotating extruders, such as those manufactured by Leistritz Extrusionstechnik and NFM Welding-Engineers, are useful and are often preferred where higher pressures or longer residence times are desired. Conical counter-rotating twin-screw extruders, such as those manufactured by Milacron, are also preferred due to large feed capabilities and high pumping efficiencies. Twin-screw co-rotating, intermeshing extruders, such as those manufactured by Coperion Werner-Pfleiderer, are especially preferred due to their high through-put rates, short residence times, flexible screw designs, outstanding alloying, and other design benefits. Both three-lobe and two-lobe machines are generally useful with two-lobe machines generally preferred due to their higher throughput rates. Ring extruders, such as those manufactured by 3+ Extruder GmbH, are also useful and typically comprise a ring of three to twelve small screws or grooved rolls around a static rod or core. The screws co rotate and intermesh on two sides providing good dispersive and distributive mixing as well as the ability to control the residence time of the material in the extruder. The intermeshing design also provides two clean wipes to the screw's shear, mixing, and kneading elements. In one embodiment, the extruder is a Toshiba TEM50A twin screw extruder.

The extruder length should be sufficient to allow for melting and intimate admixing of the polymeric components and any additional additives as well as optionally venting of the melt mixture. Extruders as short as five barrel sections may be employed, although longer extruders are also useful.

As provided above, the process for preparing a polymer composition useful for fabricating a microwavable food package or a microwavable food wrapping film, comprises:
compounding to form a master batch:
(a) 40 to 75 percent by weight of a poly(phenylene ether);
(b) 25 to 60 percent by weight of a styrenic polymer;
(c) 0.01 to 2.5 percent by weight of an optical enhancing additive;
(d) 0.003 to 0.012 percent by weight of a colorant;
(e) 0 to 3 percent by weight of an unsaturated di- or trifunctional carboxylic acid;
wherein the master batch is characterized by:
(i) a heat deflection temperature that is 92° C. to 146° C. as measured according to ASTM D648 on 6.4 mm thick bars at 1.82 MPa;
(ii) a Haze value of less than 5; and
blending the master batch with additional styrenic polymer to form a blend comprising 13 to 94 percent by weight of master batch and 87 to 6 percent by weight of styrenic polymer, wherein the blend is characterized by:
(i) a heat deflection temperature that is 92° C. to 146° C. as measured according to ASTM D648 on 6.4 mm thick bars at 1.82 MPa; and
(ii) Haze value of less than 3 as measured according to; and
(iii) a Yellowness index for films that are 200 micrometer in thick of between −5 and 2.5; and provided:
when unsaturated di- or trifunctional carboxylic acid is present, the microwavable food package or wrapping film contains 1250 or less specks that are 200 μm in size or larger in 1 m² as measured according to film surface analyzer; and further provided:
when there is 0.009 to 0.012 percent by weight of colorant present in the composition, the amount of unsaturated di- or trifunctional carboxylic acid is greater than 0 percent by weight.

In one embodiment, the poly(phenylene ether) is poly(2,6-dimethyl-1,4-phenylene ether) having an intrinsic viscosity of approximately 0.29-0.49 dL/g as measured in chloroform at 25° C.

In another embodiment, the styrenic polymer is a general purpose polystyrene.

In another embodiment, the unsaturated di- or trifunctional carboxylic acid is selected from the group consisting of citric acid, fumaric acid, itaconic acid, and malic acid, and mixtures thereof.

In another embodiment, the optical enhancing additive is an alpha-hydroxyketone selected from the group consisting of hydroxyacetone (1-hydroxy-2-propanone; acetoin (3-hydroxy-2-butanone; 2-hydroxyacetophenone; benzoin (2-hydroxy-2-phenylacetophenone; and 2-hydroxy-1-phenyl-2-p-tolyl-ethanone.

In another embodiment, the optical enhancing additive is benzoin.

In another embodiment, 0.008 to 0.012 percent by weight of colorant is present in the master batch.

In another embodiment, the master batch comprises 0.01 to 2 percent by weight of a carboxylic acid.

In another embodiment, the unsaturated di- or trifunctional carboxylic acid is fumaric acid, citric acid, or a mixture thereof.

In another embodiment, the heat deflection temperature of the master batch is 100° C. to 146° C. In another embodiment, the heat deflection temperature of the master batch is 105° C. to 140° C. In another embodiment, the heat deflection temperature of the master batch is 105° C. to 138° C. In another embodiment, the heat deflection temperature of the master batch is 110° C. to 140° C. In another embodiment, the heat deflection temperature of the master batch is 112° C. to 133° C.

In another embodiment, the heat deflection temperature of the blend is 100° C. to 140° C. In another embodiment, the heat deflection temperature of the blend is 105° C. to 138° C. In another embodiment, the heat deflection temperature of the blend is 110° C. to 136° C. In another embodiment, the heat deflection temperature of the blend is more than 112° C. and up to 130° C.

In another embodiment, the master batch of the microwavable food package or food wrapping film comprises:
(a) 40 to 70 percent by weight of a poly(phenylene ether);
(b) 30 to 60 percent by weight of a styrenic polymer;
(c) 0.5 to 2 percent by weight of benzoin;
(d) 0.005 to 0.012 percent by weight of a colorant;
wherein the master batch is characterized by:
(i) a heat deflection temperature that is 100° C. to 146° C. as measured according to ASTM D648 on 6.4 mm thick bars at 1.82 MPa;
(ii) a Haze value of less than 3;
and the blend comprises 14 to 94 percent by weight of master batch and 6 to 86 percent by weight of styrenic polymer, wherein the blend is characterized by:
(i) a heat deflection temperature that is 100° C. to 140° C. as measured according to ASTM D648 on 6.4 mm thick bars at 1.82 MPa.

In another embodiment, the master batch of the microwavable food package or food wrapping film comprises:
(a) 40 to 60 percent by weight of a poly(phenylene ether);
(b) 40 to 60 percent by weight of a styrenic polymer;
(c) 0.25 to 2.40 percent by weight of benzoin;
(d) 0.004 to 0.012 percent by weight of a colorant;
(e) 0.01 to 2 percent by weight of an unsaturated di- or trifunctional carboxylic acid which is fumaric acid, citric acid, or mixtures thereof;
wherein the master batch is characterized by:
(i) a heat deflection temperature that is 105° C. to 140° C. as measured according to ASTM D648 on 6.4 mm thick bars at 1.82 MPa;
(ii) a Haze value of less than 4;
and the blend comprises 16 to 94 percent by weight of master batch and 6 to 84 percent by weight of styrenic polymer, wherein the blend is characterized by:
(i) a heat deflection temperature that is 105° C. to 138° C. as measured according to ASTM D648 on 6.4 mm thick bars at 1.82 MPa.

In another embodiment, a film that is fabricated from the composition prepared by the process contains 1250 or less specks that are 200 μm in size or larger in 1 m².

In another embodiment, a film that is fabricated from the composition prepared by the process contains 600 or less specks that are 200 μm in size or larger in 1 m².

In another embodiment, a film that is fabricated from the composition prepared by the process contains 300 or less specks that are 200 μm in size or larger in 1 m².

In another embodiment, the master batch of the microwavable food package or food wrapping film comprises:
(a) 40 to 75 percent by weight of a poly(phenylene ether);
(b) 25 to 60 percent by weight of a styrenic polymer;
(c) 0.01 to 2.5 percent by weight of an optical enhancing additive;
(d) 0.003 to 0.012 percent by weight of a colorant;
(e) 0 to 3 percent by weight of an unsaturated di- or trifunctional carboxylic acid;
wherein the master batch is characterized by:
(i) a heat deflection temperature that is 110° C. to 140° C. as measured according to ASTM D648 on 6.4 mm thick bars at 1.82 MPa;
(ii) a Haze value of less than 2; and
and the blend comprises 16 to 94 percent by weight of master batch and 6 to 84 percent by weight of styrenic polymer, wherein the blend is characterized by:
(i) a heat deflection temperature that is 110° C. to 136° C. as measured according to ASTM D648 on 6.4 mm thick bars at 1.82 MPa.

In a further embodiment, the blend is characterized by a Notched Izod Impact of 1.5 to 4.5 kg·cm/cm as measured according to ASTM D256.

In another embodiment, a film that is fabricated from the composition prepared by the process contains 300 or less specks that are 200 μm in size or larger in 1 m² as measured according to film surface analyzer.

In these and other embodiments, the master batch has a Notched Izod Impact of 1.5 to 3.5 kg·cm/cm as measured according to ASTM D256; and a melt flow rate of 10 to 100 g/10 min at 300° C., 5 kg loading as measured according to ASTM D1238.

The master batch is prepared by compounding the poly (phenylene ether), styrenic polymer, optical enhancing agents, colorants, and optional unsaturated di- or trifunctional carboxylic acid and in an extruder. The blend is prepared by blending pelletized master batch (MB) with pelletized styrenic polymer to adjust the poly(phenylene ether) content in the resulting packaging material. Typically, the styrenic polymer is general purpose polystyrene as described herein.

In further embodiments, master batch with a comparatively low or comparatively high specific mechanical energy (SME) is prepared. SME is calculated according to the following equation:

$$\text{SME (kW*h/kg)} = \text{Actual screw speed (rpm)}/\text{Maximum screw speed (rpm)} \times \text{maximum motor electric power (kW)} \times \text{actual torque (\%)}/100/\text{Throughput rate (kg/hr)}$$

Low value SME master batch is characterized in one embodiment by an SME of 0.1 to 0.21 kW*h/kg. In another embodiment, the SME is 0.1 to 0.18 kW*h/kg. IN another embodiment, the SME 0.12 to 0.14 kW*h/kg. Low value SME master batch is typically prepared using an extruder. Typically, the extruder is a twin screw extruder. In a specific embodiment, the extruder is a twin screw extruder having a 53 mm internal diameter that operates at a screw rotation rate of approximately 150 rpm and a throughput of approximately 50 kg/h. The extruder typically utilizes 11 zones having temperatures of 100° C./150° C./200° C./220° C./220° C./230° C./230° C./240° C./240° C./250° C./260° C./Die 280° C. from feed throat to die. The resulting resin temperature is measured from the resin as it comes out of die hole. The resulting master batch material is pelletized and cooled.

High value SME master batch is characterized in one embodiment by an SME of is 0.18 to 0.35 kW*h/kg. In another embodiment, the SME is 0.20 to 0.30 kW*h/kg. IN another embodiment, the SME is 0.21 to 0.25 kW*h/kg. High value SME master batch is prepared by compounding the ingredients in an extruder as described above. Typically, the extruder is a twin screw extruder. In a specific embodiment, the extruder is a twin screw extruder having a 53 mm internal diameter and operating at a screw rotation rate of 300 rpm and a throughput of about 100 kg/h. The extruder typically utilizes 11 zones having temperatures of 100° C./150° C./200° C./220° C./220° C./230° C./230° C./240° C./240° C./250° C./260° C./Die 280° C. from feed throat to die. The resulting resin temperature is measured from the resin as it comes out of die hole. The resulting master batch material is pelletized and cooled.

For quality control assurance, a filter can be used during extrusion to prepare either low- or high-value SME master batch. Filters may be made from a variety of materials such as, but not limited to sieves, sintered-metal filters, metal mesh or screen filters, fiber metal felt filters, ceramic filters, or a combination of the foregoing materials, and the like. Any geometry or shape of melt filter that can be incorporated into a conventional extrusion assembly may be used. Thus, the melt filter can be in the form of a cone, pleated, candle, stack, flat, wraparound, screens, cartridge, or pack disc, and the like, and combinations thereof. The selection of the geometry can vary depending on various parameters such as, for example, the size of the extruder and the throughput rate desired as well as the degree of particle filtration that is desired. Exemplary materials of construction include stainless steels, titanium, nickel, as well as other metals alloys. Various weaves of wire fabric including plain, dutch, square, twill and combinations of weaves can be used. Especially useful are filters that have been designed to minimize internal volume and low flow areas and to withstand repeated cleaning cycles.

The filter may include a periodic or continuous screen changing filter or batch filters. For example, continuous screen changing filters may include a ribbon of screen filter that is slowly passed into the path of a melt flow in an extruder. The melt mixture passes through the filter and the filter collects particulate impurities within the melt and these impurities are carried out of the extruder with the filter ribbon as it is periodically or continuously renewed with a new section of ribbon. In one embodiment, the filter system comprises a single filter or a combination of two or more filters. Typically, the filter comprises two and preferably three filters that, in sequence, form a "filter sandwich," where a filter with small pore size is sandwiched between two filters with larger pore size. The pore size of the interior melt filter of the "filter sandwich" may be about 105 to 53 micrometers, corresponding to a 140 to 270 mesh filter. Within this range, a pore size of 74 micrometers, corresponding to a 200 mesh filter is preferred. The exterior filters of the "filter sandwich" have larger pore sizes, as stated previously, which may be the same or different and typically have a pore size of 1190 microns to 420 microns, corresponding to 16 mesh to 40 mesh filters. Preferably the pore size of each of the exterior filters is 841 micrometers, corresponding to a 20 mesh filter.

The filters that are used are commercially available and purchased separately, for instance, from Taiyo Wire Cloth Co. Ltd. or Ishikawa Wire Netting Co. Ltd., both of Japan. The mesh type is typically plain weave. For a 200 mesh screen, the opening size is 74 micrometers and the wire width is 0.05 mm. For the 20 mesh screen, the opening size is 841 micrometer mm and the wire width is 0.5 mm. The filter sandwiched is typically located between the die head and terminal barrel of the extruder instead of using a breaker plate. In one embodiment, the filter is typically a mesh filter or mesh filter package such as a #100 mesh/#200 mesh/#60 mesh (die side) package, is available from Taiyo Wire Cloth Co., Ltd. and is attached between the last barrel and the die.

The application includes at least the following embodiments.

Embodiment 1

A microwavable food package or food wrapping film fabricated from a polymer composition which comprises a blend of 13 to 94 percent by weight of master batch and 87 to 6 percent by weight of styrenic polymer, wherein the master batch comprises: (a) 40 to 75 percent by weight of a poly(phenylene ether); (b) 25 to 60 percent by weight of a styrenic polymer; (c) 0.01 to 2.5 percent by weight of an optical enhancing additive; (d) 0.003 to 0.012 percent by weight of a colorant; (e) 0 to 3 percent by weight of an unsaturated di- or trifunctional carboxylic acid; and wherein the master batch is characterized by (i) a heat deflection temperature that is 92° C. to 146° C. as measured according to ASTM D648 on 6.4 mm thick bars at 1.82 MPa; (ii) a Haze value of less than 5; and the blend is characterized by (i) a heat deflection temperature that is 92° C. to 146° C. as measured according to ASTM D648 on 6.4 mm thick bars at 1.82 MPa; and (ii) a Haze value of less than 3 as measured according to; and (iii) a Yellowness index for films that are 200 micrometers thick of between −5 and 2.5; and provided when unsaturated di- or trifunctional carboxylic acid is present, the microwavable food package or wrapping film contains 1250 or less specks that are 200 μm in size or larger in 1 m² as measured according to film surface analyzer; and further provided when there is 0.009 to 0.012 percent by weight of colorant present in the composition, the amount of unsaturated di- or trifunctional carboxylic acid is greater than 0 percent by weight.

Embodiment 2

A microwavable food package or food wrapping film of embodiment 1, containing 1250 or less specks that are 200 μm in size or larger in 1 m² as measured according to film surface analyzer.

Embodiment 3

The microwavable food package or food wrapping film of embodiment 2, wherein a film that is fabricated from the composition prepared by the process contains 300 or less specks that are 200 μm in size or larger in 1 m² of the film.

Embodiment 4

The microwavable food package or food wrapping film of any one of embodiments 1-3, wherein the poly(phenylene ether) is poly(2,6-dimethyl-1,4-phenylene ether) having an intrinsic viscosity of approximately 0.29-0.49 dL/g as measured in chloroform at 25° C.

Embodiment 5

The microwavable food package or food wrapping film of any one of embodiments 1-4, wherein the styrenic polymer is a general purpose polystyrene.

Embodiment 6

The microwavable food package or food wrapping film of any one of embodiments 1-5, wherein the carboxylic acid is selected from the group consisting of citric acid, fumaric acid, itaconic acid, and malic acid, and mixtures thereof.

Embodiment 7

The microwavable food package or food wrapping film of any one of embodiments 1-6, wherein the optical enhancing additive is an alpha-hydroxyketone selected from the group consisting of hydroxyacetone (1-hydroxy-2-propanone); acetoin (3-hydroxy-2-butanone); 2-hydroxyacetophenone; benzoin (2-hydroxy-2-phenylacetophenone); and 2-hydroxy-1-phenyl-2-p-tolyl-ethanone.

Embodiment 8

The microwavable food package or food wrapping film of embodiment 7, wherein the optical enhancing additive is benzoin.

Embodiment 9

The microwavable food package or food wrapping film of any one of embodiments 1-8, wherein 0.008 to 0.012 percent by weight of colorant is present in the master batch.

Embodiment 10

The microwavable food package or food wrapping film of any one of embodiments 1-9, comprising 0.01 to 2 percent by weight of the unsaturated di- or trifunctional carboxylic acid.

Embodiment 11

The microwavable food package or food wrapping film of embodiment 10, wherein the unsaturated di- or trifunctional carboxylic acid is fumaric acid, citric acid, or a mixture thereof.

Embodiment 12

The microwavable food package or food wrapping film of any one of embodiments 1-11, wherein the master batch comprises: (a) 40 to 70 percent by weight of a poly(phenylene ether); (b) 30 to 60 percent by weight of a styrenic polymer; (c) 0.5 to 2 percent by weight of benzoin; (d) 0.005 to 0.012 percent by weight of a colorant; wherein the master batch is characterized by (i) a heat deflection temperature that is 100° C. to 146° C. as measured according to ASTM D648 on 6.4 mm thick bars at 1.82 MPa; (ii) a Notched Izod Impact of 1.5 to 3.5 kg cm/cm as measured according to ASTM D256; (iii) a Haze value of less than 3; and the blend comprises 14 to 94 percent by weight of master batch and 6 to 86 percent by weight of styrenic polymer, wherein the blend is characterized by (i) a heat deflection temperature that is 100° C. to 140° C. as measured according to ASTM D648 on 6.4 mm thick bars at 1.82 MPa.

Embodiment 13

The microwavable food package or food wrapping film of embodiment 12, wherein the master batch comprises: (a) 40 to 60 percent by weight of a poly(phenylene ether); (b) 40 to 60 percent by weight of a styrenic polymer; (c) 0.25 to 2.40 percent by weight of benzoin; (d) 0.004 to 0.013 percent by weight of a colorant; (e) 0.01 to 2 percent by weight of a carboxylic acid which is fumaric acid, citric acid, or mixtures thereof; wherein the master batch is characterized by (i) a heat deflection temperature that is 105° C. to 140° C. as measured according to ASTM D648 on 6.4 mm thick bars at 1.82 MPa; (ii) a melt flow rate of 10 to 100 g/10 min at 300° C., 5 kg loading as measured according to ASTM D1238; (iii) a Haze value of less than 4; and the blend comprises 16 to 94 percent by weight of master batch and 6 to 84 percent by weight of styrenic polymer, wherein the blend is characterized by (i) a heat deflection temperature that is 105° C. to 138° C. as measured according to ASTM D648 on 6.4 mm thick bars at 1.82 MPa.

Embodiment 14

The microwavable food package or food wrapping film of any one of embodiments 1-13, wherein the master batch comprises: (a) 40 to 75 percent by weight of a poly(phenylene ether); (b) 25 to 60 percent by weight of a styrenic polymer; (c) 0.01 to 2.5 percent by weight of an optical enhancing additive; (d) 0.003 to 0.012 percent by weight of a colorant; (e) 0 to 3 percent by weight of an unsaturated di- or trifunctional carboxylic acid; wherein the master batch is characterized by (i) a heat deflection temperature that is 110° C. to 140° C. as measured according to ASTM D648 on 6.4 mm thick bars at 1.82 MPa; (ii) a melt flow rate of 10 to 100 g/10 min at 300° C., 5 kg loading as measured according to ASTM D1238; (iii) a Haze value of less than 2; and the blend comprises 16 to 94 percent by weight of master batch and 6 to 84 percent by weight of styrenic polymer, wherein the blend is characterized by (i) a heat deflection temperature that is 110° C. to 136° C. as measured according to ASTM D648 on 6.4 mm thick bars at 1.82 MPa.

Embodiment 15

A process for preparing a polymer composition for microwavable food container and film fabrication, comprising: compounding to form a master batch comprising: (a) 40 to 75 percent by weight of a poly(phenylene ether); (b) 25 to 60 percent by weight of a styrenic polymer; (c) 0.01 to 2.5 percent by weight of an optical enhancing additive; (d) 0.003 to 0.012 percent by weight of a colorant; (e) 0 to 3 percent by weight of an unsaturated di- or trifunctional carboxylic acid; and wherein the master batch is characterized by: (i) a heat deflection temperature that is 92° C. to 146° C. as measured according to ASTM D648 on 6.4 mm thick bars at 1.82 MPa; (ii) a Haze value of less than 5; and blending the master batch with additional styrenic polymer to form a blend comprising 13 to 94 percent by weight of master batch and 87 to 6 percent by weight of styrenic polymer, wherein the blend is characterized by: (i) a heat deflection temperature that is 92° C. to 146° C. as measured according to ASTM D648 on 6.4 mm thick bars at 1.82 MPa; and (ii) a Haze value of less than 3 as measured according to; and (iii) a Yellowness index for films that are 200 micrometer in thick of between −5 and 2.5; and provided when unsaturated di- or trifunctional carboxylic acid is present, the microwavable food package or wrapping film contains 1250 or less specks that are 200 μm in size or larger in 1 m² as measured according to film surface analyzer; and further provided when there is 0.009 to 0.012 percent by weight of colorant present in the composition, the amount of unsaturated di- or trifunctional carboxylic acid is greater than 0 percent by weight.

Embodiment 16

The process of embodiment 15, wherein the master batch is compounded in an extruder at high temperature and the master batch is blended with the styrenic polymer in an extruder.

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

Examples

The examples of the compositions of the present invention, annotated hereinafter as "Ex." and their comparative examples, annotated hereinafter as "CEx", employed the materials listed in Table 3. All weight percents employed in the examples are based on the weight percent of the entire composition except where stated otherwise.

The compositions, comparative examples, and testing protocols used are discussed below.

Master Batch Preparation (Extrusion with Lower Specific Mechanical Energy (SME)).

Low value SME master batch as defined previously is typically prepared using an extruder. The extruder is a twin screw extruder having a 53 mm internal diameter that operates at a screw rotation rate of approximately 150 rpm and a throughput of approximately 50 kg/h. The extruder typically utilizes 11 zones having temperatures of 100° C./150° C./200° C./220° C./220° C./230° C./230° C./240° C./240° C./250° C./260° C./Die 280° C. from feed throat to die. A filter package is typically employed during extrusion. The filter package, which is a #100 mesh/#200 mesh/#60 mesh (die side) package, is available from Taiyo Wire Cloth Co., Ltd. and is attached between the last barrel and the die. The resulting resin temperature is measured from the resin as it comes out of die hole. The resulting master batch material is pelletized and cooled.

Master Batch Preparation (Extrusion with Higher Specific Mechanical Energy, SME)

High value SME master batch as defined previously is prepared by compounding the ingredients in an extruder as described above. As described for Low SME master batch, the extruder is a twin screw extruder having a 53 mm internal diameter and operating at a screw rotation rate of 300 rpm and a throughput of about 100 kg/h. The extruder typically utilizes 11 zones having temperatures of 100° C./150° C./200° C./220° C./220° C./230° C./230° C./240° C./240° C./250° C./260° C./Die 280° C. from feed throat to die. A filter package is typically employed during extrusion. The filter package, which is a #100 mesh/#200 mesh/#60 mesh (die side) package, is available from Taiyo Wire Cloth Co., Ltd. and is attached between the last barrel and the die. The resulting resin temperature is measured from the resin as it comes out of die hole. The resulting master batch material is pelletized and cooled.

Blend Preparation

The blend is prepared by blending pelletized master batch (MB) with pelletized styrenic polymer to adjust the poly(phenylene ether) content in the resulting packaging material. Typically, the styrenic polymer is general purpose polystyrene as described herein. The blend is not extruded to be homogeneous and monolithic phase prior to the preparation of articles. The blended pellets are inserted into the extruder to fabricate films or into the barrel to mold specimens. The physical and optical properties of the resulting films and molded articles are then measured.

Film Fabrication

Films were fabricated with an extruder (L/D=32) equipped with a single screw (D=65 mm) and a T-Die (width: 1500 mm) at 4 m/min. The temperature of the barrel and the T-die in the extruder was set at 275-330° C. and 310° C., respectively. The throughput was 85 kg/h.

Compositions were compounded on a Collin E30M single-screw extruder (L/D=25) equipped with a T-Die (width: 150 mm; slit length: 1 mm). The extruder was operated at a screw rotation rate of 70 rpm and a throughput of about 9 kg/h. The barrel and T-Die temperature were set at 260° C. and 280° C., respectively. The filter package was attached between the last barrel and the T-die. The set of filters was #60 mesh/#200 mesh/#60 mesh package which is available from Taiyo wire cloth Co., Ltd. (Japan).

Speck Count

Specks on the 200 micrometer thick film were counted in 1 m² area samples using an FSA-100 film surface analyzer from Optical Control Systems. The FSA-100 was operated according to the dark field inspection method at 50% threshold. Film quality was assessed optoelectronically through the use of high resolution line cameras and the appropriate illumination technology. The method and apparatus are described in Henrik Steen and Oliver Hissmann, Standard Search for Specks, Special Reprint of Kunstoffe International October 2010; Carl Hanser Verlag: Munchen, 2010. The FSA-100 surface analyzer has the following specifications:

| | |
|---|---|
| Camera | CCD line scan camera |
| | Resolution: from 5 μm |
| Inspection Window | 0-300 mm |
| Lighting | Special LED light, halogen light |
| Computer | Industrial Intel®Core™ $_2$ Duo |
| | Up-to-date-technology |
| Software | Operating system Windows XP Professional |
| | (latest technology) |
| | Special Image Processing |
| Physical interfaces | Ethernet $_{10/100/1000}$ M Bast T, USB, |
| | RS $_{485}$ RS $_{232}$, digital & analogue I/o |
| Communication protocol | MODBUS RTU, MODBUS TCP/IP, OPC, SQL, |
| | File transfer, PROFIBUS |
| | Implementation to other Fieldbus-Systems |
| | possible |
| Remote control | CAT $_5$ Extender |
| Size dimension | (1, w, h) 35 × 15 × 15 cm |
| | (per camera-/lighting unit) |
| | Weight approx. 10 kg |
| Power supply | 230 V AC/$_{115}$ V AC, 50/60 Hz |
| Temperature | 10-40° C. |

Molding for ASTM Testing Specimens

Physical testing samples were injection molded on a Toyo Machinery & Metal Co., Ltd. Toyo Paster Ti-80G injection molding machine using a barrel temperature of 280° C. and a mold temperature of 80° C.

Testing

Testing procedures are summarized in Table 1.

TABLE 1

| Test | Description |
|---|---|
| NII | Notched Izod Impact strength (NII) was determined on one-eighth inch (3.12 mm) bars per ASTM D256 at temperatures of 23° C., and is reported in units of Joules per meter. |
| HDT | Heat Deflection Temperature (HDT) was determined according to ASTM D648 on 6.4 mm thick bars at 1.82 MPa. |
| MFI | Melt flow index (MFI) was run on dried pellets as per ASTM D1238 at 300° C. using a 5 kg weight. All molded samples were conditioned for at least 48 h at 50% relative humidity prior to testing. |
| Tg | Glass transition temperature was determined according to ASTM D3418 by operating Differential Scanning Calorimetry (DSC) at elevated rate, 10° C./min |
| Ductility | Ductility of the 200 micrometer film was determined according to ASTM D3763 by operating high speed puncture test at 23° C., 4.4 m/sec as impact velocity. |
| Haze | Haze was determined according to JIS K7136 using D65 light source with a Murakami color research lab, HM-150 haze meter |
| Transparency | Transparency was determined according to JIS K7136 using D65 light source with a Murakami color research lab, HM-150 haze meter |
| b* | b* value was determined according to CIE LAB using D65 light source, 10° observation under transmittance mode |
| YI | Yellowness index (YI) was determined according to ASTM D1925 using D65 light source and 10° observation under transmittance mode. |

Raw Materials

The materials used to prepare the composition are summarized in Table 2.

TABLE 2

| Raw material | Description |
|---|---|
| PPE-1 | Poly(2,6-dimethyl-1,4-phenylene ether), CAS Reg. No. 25134-01-4, having an intrinsic viscosity of 0.46 deciliter per gram, measured in chloroform at 25° C., and obtained as PPO™646 resin from SABIC ("0.46 IV PPE"). FDA compliant. |
| PPE-2 | Poly(2,6-dimethyl-1,4-phenylene ether), CAS Reg. No. 25134-01-4, having an intrinsic viscosity of 0.4 deciliter per gram, measured in chloroform at 25° C., and obtained as PPO™640 resin from SABIC ("0.4 IV PPE"). FDA compliant. |
| PPE-3 | Poly(2,6-dimethyl-1,4-phenylene ether), CAS Reg. No. 25134-01-4, having an intrinsic viscosity of 0.3 deciliter per gram, measured in chloroform at 25° C., and obtained as PPO™630 resin from SABIC ("0.30 IV PPE"). FDA compliant. |
| GPPS | General purpose Polystyrene available as Dicstyrene CR-3500 and Toyo Styrole G210 from DIC corporation and Toyo Styrene, respectively. FDA compliant. |
| F297 | Benzoin, CAS Reg. No. 119-53-9, obtained from EUTEC Chemical Co. Ltd and Aceto Chemical Co. Ltd. FDA compliant. |
| CA | Citiric acid, CAS Reg. No. 77-92-9, obtained from Maruzen chemicals Co. Ltd. FDA compliant. |
| FA | Fumaric acid, CAS Reg. No. 110-17-8, obtained from Kanto Chemical Co. Ltd. FDA compliant |
| R75 | C.I. Solvent Blue 104, CAS Reg. No. 116-75-6, available as SOLVAPERM™ Blue 2B from Clariant. FDA compliant. |
| R71 | Anthraquinone dye, CAS Reg. No. 81-48-1, available as MACROLEX™ Violet B from Bayer and LANXESS. FDA compliant. |

Results

Tables 3 and 4 summarize the testing results for Comparative Examples and Examples of compositions of the present invention.

No unsaturated difunctional or trifunctional carboxylic acid is present in the examples and comparative examples summarized in Table 3. As can be seen from Table 3, CEX1, CEX2, CEX3, and CEX4, all contained poly(2,6-dimethyl-1,4-phenylene ether) outside of the desirable weight percent range. CEX3 and CEX4 were not blended. CEX5 did not contain benzoin. CEX5 and CEX6 did not contain colorant. CEX7 contained colorant outside of the desirable range.

EX1-9, with component weight percents in the desirable ranges, all gave HDT and Haze values in the acceptable range for the master batch material and the blend.

In contrast, CEX1 and CEX2, with 80 weight percent of poly(2,6-dimethyl-1,4-phenylene ether) present, gave HDT values outside of the desired range, and CEX3 and CEX4 gave haze values outside the desired range. This is possibly due to the viscosity of molten resins that comprises poly(phenylene ether) resin and styrenic polymers. The viscosity of poly(phenylene ether) resin is substantially higher than that of styrenic polymers. A lower content of poly(phenylene ether) resin in the composition gives rise to molten resin with lower viscosity that cannot be heated to a sufficient temperature to dissolve poly(phenylene ether) resin into styrenic polymer during extrusion. Typically, poly(phenylene ether) resin mixes well with styrenic polymers to provide a homogeneous phase. It is noteworthy that poly (phenylene ether) resin which is dispersed in, but not dissolved in, the styrenic polymer has less energy (lower temperature), giving rise to compositions with higher haze values.

The process for making the master batch and for product fabrication is the preferred way to provide homogeneous monolithic molded parts and films of the invention. A composition with lower content of poly(phenylene ether) resin cannot be obtained by one-time extrusion. Once the master batch is provided, the viscosity of the master batch is closer to the styrenic polymer, easing the merging of the materials. Thus, advantageously, a customer or manufacturer can readily blend the material to prepare articles with the desired heat parameters.

CEX5, CEX6 and CEX7 gave yellowness index (YI) values that are too high (too yellowish) for food packaging uses. The yellowness of CEX5, CEX6 and CEX7 may have been observed because the samples did not contain both a decolorizing agent and bluing colorants, respectively. CEX7 gave a higher yellowness index (YI) value because of the higher operation temperature. Yellowing can also occur due to higher loading of poly(phenylene ether) resin. A higher loading of poly(phenylene ether) resin leads to a master batch with higher viscosity, which consequently requires a higher temperature during compounding to adjust (lower) the viscosity. Also, poly(phenylene ether) resin tends to be yellow in color because of its tendency to undergo oxidation when heated. Although material that has a higher HDT is desirable, the higher content of poly(phenylene ether) resin may shift the color of the material to yellow.

The results for EX1, EX3, and EX4 suggest that any type of poly(phenylene ether) resin can be used in the master batch and blending process to provide transparent poly (phenylene ether) resin CEX7 gave intensely blue molded parts and fabricated films due to large quantity of colorant used (0.015 pph).

Based on the examples provided in Table 3, the ratio of poly(phenylene ether) resin to general purpose polystyrene in the master batch is preferably 40:60 to 70:30. The total colorant concentration in the master batch is preferably less than or equal to 0.001 pph but more than 0 pph. The ratio of poly(phenylene ether) resin to the optical enhancing agent (benzoin compound) in the master batch is preferably to 10:1 to 70:1 The poly(phenylene ether) resin content in the blend and the films through the blending process is preferably 10 to 55 parts by weight.

TABLE 3

| | EX 1 | EX 2 | EX 3 | Ex 4 | Ex 5 | EX 6 | Ex 7 | Ex 8 |
|---|---|---|---|---|---|---|---|---|
| NORYL resin (Master batch) Raw material | | | | | | | | |
| PPE-1 | 50 | 50 | | | 50 | 50 | 50 | 70 |
| PPE-2 | 0 | 0 | 50 | 0 | 0 | 0 | 0 | 0 |
| PPE-3 | 0 | 0 | 0 | 50 | 0 | 0 | 0 | 0 |
| CR3500 | 50 | 50 | 50 | 50 | 50 | 50 | 50 | 30 |
| F297 | 0.5 | 2 | 1 | 1 | 1 | 1 | 1 | 1 |
| R75 | 0.003 | 0.003 | 0.003 | 0.003 | 0.003 | 0.003 | 0.003 | 0.004 |
| R71 | 0.002 | 0.002 | 0.002 | 0.002 | 0.002 | 0.002 | 0.002 | 0.003 |
| CA-ADM | 0 | 0 | 0 | 0 | 0 | 0 | 0 | 0 |
| FA | 0 | 0 | 0 | 0 | 0 | 0 | 0 | 0 |
| Conditions | | | | | | | | |
| SME (kW * h/kg) | 0.1 | 0.1 | 0.1 | 0.1 | 0.1 | 0.1 | 0.1 | 0.2 |
| Barrel temp (° C.) | 260 | 260 | 260 | 260 | 260 | 260 | 260 | 260 |
| Resin temp (° C.) | 304 | 301 | 295 | 291 | 300 | 300 | 300 | 339 |
| HDT (° C. @ 1.8 MPa) | 126 | 121 | 119 | 120 | 121 | 121 | 121 | 145 |
| NH (kg · cm/cm) | 2.4 | 2.5 | 2.1 | 1.5 | 2.4 | 2.4 | 2.4 | 2.5 |
| MFI (g/10 min, @ 300° C., 5 kg) | 33 | 41 | 53 | 86 | 37 | 37 | 37 | 14 |
| Haze, D65 | 1.7 | 1.6 | 0.7 | 0.9 | 0.9 | 0.9 | 0.9 | 1.0 |
| Properties of Blend | | | | | | | | |
| MB/GPPS | 75/25 | 75/25 | 75/25 | 75/25 | 75/25 | 40/60 | 20/80 | 54/56 |
| PPE content | 37.5 | 37.5 | 37.5 | 37.5 | 37.5 | 20.0 | 10.0 | 37.5 |
| HDT (° C. @ 1.8 MPa) | 116 | 111 | 112 | 112 | 121 | 100 | 93 | 116 |
| NH (kg · cm/cm) | 3.4 | 3.3 | 2.8 | 3.0 | 2.4 | 2.7 | 2.7 | 3.4 |
| Haze, D65 | 1.1 | 1.6 | 1.0 | 1.6 | 1.5 | 0.7 | 1.1 | 1.5 |
| Performance of Films | | | | | | | | |
| Barrel temp (° C.) | 260 | 260 | 260 | 260 | 260 | 260 | 260 | 260 |
| Screw compression (C/R) | 2.8 | 2.8 | 2.8 | 2.8 | 2.8 | 2.8 | 2.8 | 2.8 |
| Grass transition temp. (° C.) | — | — | — | — | 128 | 112 | 107 | — |
| Ductility (J) | — | — | 0.07 | 0.05 | — | — | — | — |
| Haze, D65 | 1.1 | 2.5 | 1.0 | 1.6 | 1.3 | 0.7 | 1.1 | 0.6 |

TABLE 3-continued

|  |  |  |  |  |  |  |  |  |
|---|---|---|---|---|---|---|---|---|
| Transmittance (%, D65) | 87.2 | 86.3 | 87.1 | 87.3 | 87.5 | 86.7 | 89.4 | 87.0 |
| b* (CEI, D65, 10°) | 0.3 | −0.1 | 0.1 | 0.0 | 0.5 | 0.5 | 0.4 | 0.0 |
| YI (D65, 10°) | −0.1 | −1.3 | −0.7 | −0.8 | 0.2 | −0.1 | 0.6 | −0.5 |
| number of specks over 200 μm 4 m/min, OCS, 2 mm slit | — | — | — | — | — | — | — | — |

|  | CEx 1 | Ex 9 | CEx 2 | CEx 3 | CEx 4 | CEx 5 | CEx 6 | CEx 7 |
|---|---|---|---|---|---|---|---|---|
| NORYL resin (Master batch) Raw material |  |  |  |  |  |  |  |  |
| PPE-1 | 80 | 70 | 80 | 20 | 30 | 50 | 50 | 50 |
| PPE-2 | 0 | 0 | 0 | 0 | 0 | 0 | 0 | 0 |
| PPE-3 | 0 | 0 | 0 | 0 | 0 | 0 | 0 | 0 |
| CR3500 | 20 | 30 | 20 | 80 | 70 | 50 | 50 | 50 |
| F297 | 1 | 1 | 1 | 1 | 1 | 0 | 1 | 1 |
| R75 | 0.005 | 0.003 | 0.003 | 0.003 | 0.003 | 0 | 0 | 0.009 |
| R71 | 0.003 | 0.002 | 0.002 | 0.002 | 0.002 | 0 | 0 | 0.006 |
| CA-ADM | 0 | 0 | 0 | 0 | 0 | 0 | 0 | 0 |
| FA | 0 | 0 | 0 | 0 | 0 | 0 | 0 | 0 |
| Conditions |  |  |  |  |  |  |  |  |
| SME (kW * h/kg) | 0.2 | 0.1 | 0.2 | 0.1 | 0.1 | 0.1 | 0.1 | 0.1 |
| Barrel temp (° C.) | 260 | 260 | 260 | 260 | 260 | 260 | 260 | 260 |
| Resin temp (° C.) | 360 | 336 | 351 | 273 | 286 | 298 | 299 | 300 |
| HDT (° C. @ 1.8 MPa) | 157 | 141 | 152 | 92 | 106 | 122 | 119 | 121 |
| NH (kg · cm/cm) | 2.8 | 3.0 | 3.1 | 1.1 | 1.7 | 2.7 | 2.4 | 2.3 |
| MFI (g/10 min, @ 300° C., 5 kg) | 9 | 16 | 10 | 150 | 107 | 41 | 35 | 38 |
| Haze, D65 | 0.9 | 0.9 | 1.9 | 57.1 | 20.3 | 0.8 | 0.9 | 0.6 |
| Properties of Blend |  |  |  |  |  |  |  |  |
| MB/GPPS | 47/53 | 75/25 | 75/25 | N/B | N/B | 75/25 | 75/25 | 75/25 |
| PPE content | 37.5 | 52.5 | 60 | N/B | N/B | 37.5 | 37.5 | 37.5 |
| HDT (° C. @ 1.8 MPa) | 114 | 129 | 136 | N/B | N/B | 116 | 114 | 113 |
| NH (kg · cm/cm) | 3.5 | 3.0 | 3.2 | N/B | N/B | 2.7 | 3.2 | 3.2 |
| Haze, D65 | 3.0 | 0.4 | 1.4 | N/B | N/B | 1.7 | 1.5 | 2.2 |
| Performance of Films |  |  |  |  |  |  |  |  |
| Barrel temp (° C.) | 260 | 260 | 260 | — | — | 260 | 260 | 260 |
| Screw compression (C/R) | 2.8 | 2.8 | 2.8 | — | — | 2.8 | 2.8 | 2.8 |
| Grass transition temp. (° C.) | — | — | — | — | — | — | — | — |
| Ductility (J) | — | — | — | — | — | — | — | — |
| Haze, D65 | 0.6 | 0.4 | 1.1 | — | — | 1.7 | 1.5 | 2.2 |
| Transmittance (%, D65) | 87.1 | 86.9 | 86.1 | — | — | 89.2 | 90.2 | 81.8 |
| b* (CEI, D65, 10°) | 1.5 | 1.8 | 1.9 | — | — | 3.6 | 2.2 | −2.7 |
| YI (D65, 10°) | 1.7 | 2.2 | 2.6 | — | — | 6.2 | 3.7 | −6.9 |
| number of specks over 200 μm 4 m/min, OCS, 2 mm slit | — | — | — | — | — | — | — | — |

N/B = not blended

In Table 4, unsaturated difunctional or trifunctional carboxylic acid is present in the examples. EX10-15 had either citric acid or fumaric acid in the master batch, as compared to CEX8, CEX9, and CEX10, which did not. The other components of EX10-15 were present in the desirable weight percent range.

CEX9 gave a higher haze value for the blend due to the lack of miscibility between the poly(phenylene ether) and polystyrene, and thus because of the viscosity difference between the poly(phenylene ether) resin and the polystyrene.

Surprisingly, we found that EX10-15 had a fewer number of specks over 200 μm than CEX8-10.

EX10-EX15 had suitable poly(phenylene ether) resin content in the blend and thus for films for microwavable food packaging. Less than 10 parts of poly(phenylene ether) resin gave lower or equal heat of polystyrene and larger than 55 parts gave more yellowish and immiscibility with polystyrene due to the viscosity gap between poly(phenylene ether) resin and polystyrene. Ten percent by weight of poly(phenylene ether) resin in the blend and film can provide material that can withstand microwave oven heating.

The foregoing invention has been described in some detail by way of illustration and example for purposes of clarity and understanding. The invention has been described with reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled. If a term in the present application contradicts or conflicts with a term in the incorporated reference, the term from the present application takes precedence over the conflicting term from the incorporated reference.

The invention claimed is:
1. A microwavable food package or food wrapping film fabricated from a polymer composition which comprises a blend of 13 to 94 percent by weight of master batch and 87 to 6 percent by weight of styrenic polymer, wherein the master batch comprises:

TABLE 4

|  | EX 10 | EX 11 | EX 12 | Ex 13 | Ex 14 | EX 15 | CEx 8 | CEx 9 | CEx 10 |
|---|---|---|---|---|---|---|---|---|---|
| NORYL resin (Master batch) Raw material | | | | | | | | | |
| PPE-1 | 50 | 50 | 50 | 50 | 60 | 50 | 50 | 50 | 50 |
| PPE-2 | 0 | 0 | 0 | 0 | 0 | 0 | 0 | 0 | 0 |
| PPE-3 | 0 | 0 | 0 | 0 | 0 | 0 | 0 | 0 | 0 |
| CR3500 | 50 | 50 | 50 | 50 | 40 | 50 | 50 | 50 | 50 |
| F297 | 1 | 1 | 0 | 1 | 1 | 1 | 0 | 0 | 1 |
| R75 | 0.006 | 0.006 | 0.006 | 0.006 | 0.006 | 0.003 | 0.006 | 0.003 | 0.006 |
| R71 | 0.004 | 0.004 | 0.004 | 0.004 | 0.004 | 0.002 | 0.004 | 0.002 | 0.004 |
| CA-ADM | 1 | 3 | 1 | 0 | 1 | 1 | 0 | 0 | 0 |
| FA | 0 | 0 | 0 | 1 | 0 | 0 | 0 | 0 | 0 |
| Conditions | | | | | | | | | |
| SME (kW * h/kg) | 0.2 | 0.2 | 0.2 | 0.2 | 0.2 | 0.2 | 0.2 | 0.1 | 0.2 |
| Barrel temp (° C.) | 300 | 300 | 300 | 300 | 300 | 260 | 300 | 260 | 300 |
| Resin temp (° C.) | 333 | 342 | 348 | 346 | 346 | 291 | 354 | 299 | 351 |
| HDT (° C. @ 1.8 MPa) | 126 | 125 | 127 | 127 | 135 | 124 | 129 | 124 | 126 |
| NII (kg · cm/cm) | 2.8 | 1.9 | 2.0 | 1.9 | 3.2 | 2.4 | 2.5 | 2.3 | 2.3 |
| MFI (g/10 min, @ 300° C., 5 kg) | 36 | 44 | 37 | 41 | 25 | 44 | 36 | 36 | 36 |
| Haze, D65 | 1.8 | 1.9 | 1.3 | 1.1 | 1.4 | 3.9 | 1.5 | 0.8 | 1.7 |
| Properties of Blend | | | | | | | | | |
| MB/GPPS | 75/25 | 75/25 | 75/25 | 75/25 | 62.5/37.5 | 75/25 | 75/25 | 75/25 | 75/25 |
| PPE content | 37.5 | 37.5 | 37.5 | 37.5 | 37.5 | 37.5 | 37.5 | 37.5 | 37.5 |
| HDT (° C. @ 1.8 MPa) | 114 | 113 | 117 | 114 | 114 | 114 | 116 | 116 | 113 |
| NII (kg · cm/cm) | 1.6 | 1.8 | 2.0 | 2.0 | 1.9 | 3.9 | 1.9 | 2.3 | 2.1 |
| Haze, D65 | 0.6 | 0.5 | 0.6 | 0.4 | 0.5 | 0.9 | 0.6 | 1.1 | 0.5 |
| Performance of Films | | | | | | | | | |
| Barrel temp (° C.) | 260 | 260 | 260 | 260 | 260 | 260 | 260 | 260 | 260 |
| Screw compression (C/R) | 2.5 | 2.5 | 2.5 | 2.5 | 2.5 | 2.5 | 2.5 | 2.8 | 2.5 |
| Grass transition temp. (° C.) | — | — | — | — | — | — | — | — | — |
| Ductility (J) | — | — | — | — | — | — | — | — | 0.07 |
| Haze, D65 | 0.6 | 0.5 | 0.6 | 0.4 | 0.5 | 0.7 | 0.6 | 1.1 | 0.5 |
| Transmittance (%, D65) | 82.6 | 83.2 | 82.0 | 83.7 | 84.2 | 86.4 | 82.9 | 86.1 | 84.2 |
| b* (CEI, D65, 10°) | 0.6 | 0.9 | 2.0 | −0.7 | 0.6 | 1.6 | −0.3 | 1.9 | −1.2 |
| YI (D65, 10°) | −1.4 | −0.4 | 2.0 | −3.0 | −0.5 | 1.8 | −2.0 | 2.6 | −3.7 |
| number of specks over 200 μm 4 m/min, OCS, 2 mm slit | 168 | 195 | 177 | 69 | 273 | 1234 | 1373 | 3046 | 1276 |

(a) 40 to 75 percent by weight of a poly(phenylene ether);
(b) 25 to 60 percent by weight of a styrenic polymer;
(c) 0.01 to 2.5 percent by weight of an optical enhancing additive; wherein the optical enhancing additive is an alpha-hydroxyketone selected from the group consisting of hydroxyacetone (1-hydroxy-2-propanone); acetoin (3-hydroxy-2-butanone); 2-hydroxyacetophenone; benzoin (2-hydroxy-2-phenylacetophenone); and 2-hydroxy-1-phenyl-2-p-tolyl-ethanone;
(d) 0.003 to 0.012 percent by weight of a colorant;
(e) 0.01 to 2 percent by weight of a di- or trifunctional carboxylic acid selected from the group consisting of citric acid, fumaric acid, itaconic acid, and malic acid, and mixtures thereof; and wherein:
the master batch is characterized by:
(i) a heat deflection temperature that is 92° C. to 146° C. as measured according to ASTM D648 on 6.4 mm thick bars at 1.82 MPa;
(ii) a Haze value of less than 5; and
and the blend is characterized by:
(i) a heat deflection temperature that is 92° C. to 146° C. as measured according to ASTM D648 on 6.4 mm thick bars at 1.82 MPa; and
(ii) a Haze value of less than 3 as measured according to; and
(iii) a Yellowness index for films that are 200 micrometers thick of between −5 and 2.5; and provided:
when di- or trifunctional carboxylic acid is present, the microwavable food package or wrapping film contains 1250 or less specks that are 200 μm in size or larger in 1 m² as measured according to film surface analyzer; and further provided:
when there is 0.009 to 0.012 percent by weight of colorant present in the composition, the amount of di- or trifunctional carboxylic acid is greater than 0 percent by weight.

2. The microwavable food package or food wrapping film of claim 1, wherein a film that is fabricated from the composition contains 300 or less specks that are 200 μm in size or larger in 1 m² of the film.

3. The microwavable food package or food wrapping film of claim 1, wherein the poly(phenylene ether) is poly(2,6-dimethyl-1,4-phenylene ether) having an intrinsic viscosity of approximately 0.29-0.49 dL/g as measured in chloroform at 25° C.

4. The microwavable food package or food wrapping film of claim 1, wherein the styrenic polymer is a general purpose polystyrene.

5. The microwavable food package or food wrapping film of claim 1, wherein the optical enhancing additive is benzoin.

6. The microwavable food package or food wrapping film of claim 1, wherein 0.008 to 0.012 percent by weight of colorant is present in the master batch.

7. The microwavable food package or food wrapping film of claim 1, wherein the di- or trifunctional carboxylic acid is fumaric acid, citric acid, or a mixture thereof.

8. The microwavable food package or food wrapping film of claim 1, wherein the master batch comprises:
(a) 40 to 60 percent by weight of a poly(phenylene ether);
(b) 40 to 60 percent by weight of a styrenic polymer;
(c) 0.25 to 2.40 percent by weight of benzoin;
(d) 0.004 to 0.012 percent by weight of a colorant;
(e) 0.01 to 2 percent by weight of a carboxylic acid which is fumaric acid, citric acid, or a mixture thereof wherein the master batch is characterized by:
(i) a heat deflection temperature that is 105° C. to 140° C. as measured according to ASTM D648 on 6.4 mm thick bars at 1.82 MPa;
(ii) a Notched Izod Impact of 1.5 to 3.5 kg cm/cm as measured according to ASTM D256;
(iii) a Haze value of less than 3;
(iv) a melt flow rate of 10 to 100 g/10 min at 300° C., 5 kg loading as measured according to ASTM D1238;
and the blend comprises 16 to 94 percent by weight of master batch and 6 to 84 percent by weight of styrenic polymer, wherein the blend is characterized by:
(i) a heat deflection temperature that is 105° C. to 138° C. as measured according to ASTM D648 on 6.4 mm thick bars at 1.82 MPa.

9. A process for preparing a polymer composition for microwavable food container and film fabrication, comprising:
compounding to form a master batch comprising:
(a) 40 to 75 percent by weight of a poly(phenylene ether);
(b) 25 to 60 percent by weight of a styrenic polymer;
(c) 0.01 to 2.5 percent by weight of an optical enhancing additive; wherein the optical enhancing additive is an alpha-hydroxyketone selected from the group consisting of hydroxyacetone (1-hydroxy-2-propanone); acetoin (3-hydroxy-2-butanone); 2-hydroxyacetophenone; benzoin (2-hydroxy-2-phenylacetophenone); and 2-hydroxy-1-phenyl-2-p-tolyl-ethanone;
(d) 0.003 to 0.012 percent by weight of a colorant;
(e) 0.01 to 2 percent by weight of a di- or trifunctional carboxylic acid selected from the group consisting of citric acid, fumaric acid, itaconic acid, and malic acid, and mixtures thereof; and wherein:
the master batch is characterized by:
(i) a heat deflection temperature that is 92° C. to 146° C. as measured according to ASTM D648 on 6.4 mm thick bars at 1.82 MPa;
(ii) a Haze value of less than 5; and
blending the master batch with additional styrenic polymer to form a blend comprising 13 to 94 percent by weight of master batch and 87 to 6 percent by weight of styrenic polymer, wherein the blend is characterized by:
(i) a heat deflection temperature that is 92° C. to 146° C. as measured according to ASTM D648 on 6.4 mm thick bars at 1.82 MPa; and
(ii) a Haze value of less than 3 as measured according to; and
(iii) a Yellowness index for films that are 200 micrometer in thick of between −5 and 2.5; and provided:
when di- or trifunctional carboxylic acid is present, the microwavable food package or wrapping film contains 1250 or less specks that are 200 μm in size or larger in 1 m² as measured according to film surface analyzer; and further provided:
when there is 0.009 to 0.012 percent by weight of colorant present in the composition, the amount of di- or trifunctional carboxylic acid is greater than 0 percent by weight.

10. The process of claim 9, wherein the master batch is compounded in an extruder at high temperature and the master batch is blended with the styrenic polymer in an extruder.

* * * * *